(12) United States Patent
Nerger et al.

(10) Patent No.: US 8,984,657 B2
(45) Date of Patent: Mar. 17, 2015

(54) SYSTEM AND METHOD FOR REMOTE MANAGEMENT OF APPLICATIONS DOWNLOADED TO A PERSONAL PORTABLE WIRELESS APPLIANCE

(75) Inventors: Paul Shelton Nerger, San Francisco, CA (US); Aashin Nagpal, Cupertino, CA (US); Holger Assenmacher, Eulenbis (DE)

(73) Assignee: Appcentral, Inc., San Francisco, CA (US)

( * ) Notice: Subject to any disclaimer, the term of this patent is extended or adjusted under 35 U.S.C. 154(b) by 797 days.

(21) Appl. No.: 12/975,145

(22) Filed: Dec. 21, 2010

(65) Prior Publication Data

US 2011/0145932 A1    Jun. 16, 2011

Related U.S. Application Data

(63) Continuation-in-part of application No. 12/876,214, filed on Sep. 6, 2010.

(60) Provisional application No. 61/276,129, filed on Sep. 8, 2009.

(51) Int. Cl.
*G06F 7/04* (2006.01)
*H04W 12/10* (2009.01)
*G06F 9/445* (2006.01)
*H04W 8/24* (2009.01)
*H04L 29/08* (2006.01)
*H04W 12/06* (2009.01)

(52) U.S. Cl.
CPC .............. *H04W 12/10* (2013.01); *G06F 8/65* (2013.01); *H04W 8/245* (2013.01); *H04L 67/34* (2013.01); *H04L 67/125* (2013.01); *H04W 12/06* (2013.01)
USPC .......................................................... 726/29

(58) Field of Classification Search
USPC .......................................................... 726/29
See application file for complete search history.

(56) References Cited

U.S. PATENT DOCUMENTS

| | | | | |
|---|---|---|---|---|
| 6,021,438 | A  * | 2/2000 | Duvvoori et al. ............. | 709/224 |
| 7,089,259 | B1 * | 8/2006 | Kouznetsov et al. ................. | 1/1 |
| 7,917,963 | B2 * | 3/2011 | Goyal et al. .................... | 726/29 |
| 8,224,750 | B1 * | 7/2012 | Bennett et al. .................. | 705/59 |
| 8,250,523 | B2 * | 8/2012 | Hall et al. ..................... | 717/106 |
| 2002/0107809 | A1 * | 8/2002 | Biddle et al. .................... | 705/59 |

(Continued)

FOREIGN PATENT DOCUMENTS

| | | |
|---|---|---|
| EP | 1376930 A2 | 1/2004 |
| KR | 10-2008-0006881 A | 1/2008 |

OTHER PUBLICATIONS

Sophos. "Zippo Trojan horse demands $300 ransom for victims' encrypted data". Mar. 15, 2006. pp. 1-2.*

(Continued)

*Primary Examiner* — Imad Hussain
(74) *Attorney, Agent, or Firm* — EIP US LLP

(57) ABSTRACT

The present invention relates to a system and method for remote management of applications downloaded to a personal portable appliance. Applications comprising programs and data structures are updated to include a dummy application that can replace the ordinarily executable application and that manipulates the data structure when invoked, so as to limit it. The dummy application is subsequently reduced to have a limited amount of the original functionality and to prompt the user to delete it.

20 Claims, 5 Drawing Sheets

(56) References Cited

U.S. PATENT DOCUMENTS

| | | | |
|---|---|---|---|
| 2002/0188625 A1* | 12/2002 | Jans et al. | 707/203 |
| 2006/0073820 A1* | 4/2006 | Craswell et al. | 455/419 |
| 2006/0277590 A1* | 12/2006 | Limont et al. | 726/1 |
| 2007/0271162 A1* | 11/2007 | Shuster | 705/34 |
| 2008/0201453 A1* | 8/2008 | Assenmacher | 709/219 |
| 2013/0117089 A1* | 5/2013 | Pachikov et al. | 705/14.26 |

OTHER PUBLICATIONS

Seybold, Patrick. "PS3 Firmware (v3.21) Update". Mar. 28, 2010. p. 1.*

International Search Report on WO 2011/037741 published Mar. 31, 2011 (Application PCT/US2010/047956 filed Sep. 7, 2010 in the name of ONDEEGO, Inc.).

* cited by examiner

SYSTEM AND METHOD FOR REMOTE MANAGEMENT OF APPLICATIONS DOWNLOADED TO A PERSONAL PORTABLE WIRELESS APPLIANCE

CROSS REFERENCE TO RELATED APPLICATIONS

This Application is a continuation-in-part of U.S. patent application Ser. No. 12/876,214, filed on Sep. 6, 2010, and entitled "System and Methods to Store, Retrieve, Manage, Augment and Monitor Applications on Appliances," which claims the benefit of U.S. Provisional Patent Application No. 61/276,129, filed Sep. 8, 2009, and entitled "Method and System to Store, Retrieve, Manage, Functionally Augment and Monitor Applications for Mobile Devices." This Application also claims priority to International. Application No. PCT/US2010/047956, filed Sep. 7, 2010 and published in PCT Patent Publication WO/2011/037741. The entire contents of each of the aforementioned applications are hereby incorporated by reference.

Further, the entire contents of U.S. patent application Ser. No. 12/032,093, filed Feb. 15, 2008 and entitled "Methods and System to Create Applications and Distribute Applications to a Remote Device", are hereby incorporated by reference.

BACKGROUND OF THE INVENTION

The present invention relates to a system and methods for controlling application programs which have been downloaded to a personal appliance such as a smart phone or a personal tablet such as an iPad.

In a typical system, a user permits an application, being a program along with associated data, to be downloaded from a remote server and then installed on the appliance. A typical example of this may be seen with the very successful model developed by Apple Computer where their iPhone smartphone product interacts with their App Store (application store) hosted in their iTunes distribution network. Here, a user of the smartphone searches the App Store for a desired application and, after an exchange of information to validate the user's intent along with any required payment information, the application is downloaded. Following the download, the program is installed automatically and is then ready to use. From time to time, applications may receive updates from the publisher which may be a corporate administrator whereupon a user may choose to authorize the update or else may continue to operate the existing version of the application. A user may remove or un-install the application, deleting it using the user interface provisions of the appliance, but there is no defined mechanism for an application to be un-installed remotely which does not require the user to assign full control of the appliance to the corporate administrator. This latter is generally not a preferred approach.

A key to managing corporate assets is the ability to control access to corporate data. Where the data resides on a personal appliance such as a smart phone and is accessed by a local program or application, there is a greatly increased risk of loss. Theft of sensitive data is increasingly commonplace and corporations are exposed to potentially disastrous losses that would destroy the business. To this end, considerable attention has been focused upon methods to protect the data but these generally depend upon physical security of the appliance. Once the device upon which the data resides is lost, it must be assumed that it is compromised and so, at very least, it is essential that data manipulation permissions, such as read, write, copy and print are remotely controllable by the owner of the data. It is generally not enough to simply set these permissions to the negative to deny access and a preferable mechanism would be to either remove the data or alter it so that it was no longer useful. Certainly, in this simple example where the appliance has been taken from the user, there is no possibility that appliance control will be ceded to any other entity and it must be assumed that the purpose of the misappropriation was to abscond with the sensitive information contained on or in the appliance.

In the co-pending U.S. application Ser. No. 12/876,214 filed on Sep. 6, 2010, entitled "System and Methods to Store, Retrieve, Manage, Augment and Monitor Applications on Appliances," one of the features of the AppGuard™ technology is to evaluate the user permissions at each use session and, if the permission is denied or set invalid, then persistent data can be deleted. Once this happens, although the application may no longer access that information because it is either removed or altered, that is to say deleted to read zero or some known, unusable state, the data structure may still be discerned and if this can be extracted, then data which has not yet been deleted that is stored in the structure may be now vulnerable. Worse, if this knowledge is used in conjunction with a second appliance where the data is yet intact, then its data may be totally compromised. A better solution would be to entirely remove the application itself in addition to deleting or obfuscating the data. Using the iPhone™ model as an example still, altering a data base from outside an application is fraught with difficulty because the rules that govern application interaction are designed to prevent this kind of activity. In general, application data is protected by the appliance's operating system so that it is not even readable from outside that application and certainly not alterable. It may be reasonably assumed that this partitioning of data sets is a fairly uniform goal regardless of the target appliance and this assumption may be applied to other phones and computers such as the Blackberry™ and classes of products based on the Android™ operating system. It should be clear that if an application dataset can be manipulated externally, then there is an opportunity for a malicious program to wreak havoc in the machine.

Accordingly, the only application which is permitted to alter data is that application to which the data is native. Although there are very limited instances where an application can collect information from another program's dataset or from data objects which are considered common or shared data, for example, the information from an address book native to the appliance can often be read, this practice is discouraged, citing privacy concerns. However, so long as data is being used for a specific single task such as navigation or presence confirmation (a user is confirmed as being within a particular geographic area) rather than harvested for subsequent manipulation (such as stored with a view to recording the user's activities), there is less concern. In general any application is allocated a limited data space which is, for practical purposes, invisible to all but that application.

It is therefore apparent that an urgent need exists for a method that permits a remote supervisor to safeguard corporate information, manipulating both the data and especially the application in a way that can be used to secure any corporate information. This improved application management technique enables corporate control of individual appliances in as much as they represent a security concern and may be implemented within the terms of the application management contracts which govern application distribution, function and use. An additional goal is to minimize user concerns for the maintenance of privacy as to any personal data which may be stored on the appliance and to avoid requiring that the user cede control of the appliance to another.

SUMMARY OF THE INVENTION

To achieve the foregoing and in accordance with the present invention, a system and method for remote management of applications downloaded to a personal portable appliance is provided. In particular the system and methods for allowing an application to be disabled remotely and optionally for the data to be obfuscated or deleted so as to make it secure from un-permitted access.

There are numerous examples of application and data downloading well known in the art. Securing this information is the subject of U.S. application Ser. No. 12/876,214 filed on Sep. 6, 2010, entitled "System and Methods to Store, Retrieve, Manage, Augment and Monitor Applications on Appliances," which application claims priority to U.S. provisional application No. 61/276,129 filed Sep. 8, 2009, entitled "Method and System to Store, Retrieve, Manage, Functionally Augment and Monitor Applications for Mobile Devices", by Aashin Nagpal, Ken Singer and Holger Assenmacher which are hereby fully incorporated by reference herein for all purposes. Once an application along with its associated data is downloaded to and installed upon an appliance, a user may then make use of the application and its data. Included in the class of appliances are smartphones, wirelessly connected portable computers such as laptops or "Netbooks" and tablet based computers such as the Apple iPad™ or the LG Tab™.

When an application is invoked by a user, a component of the application checks to see whether or not the appliance has a network or communications connection and is able to access the managing server. In cases where the appliance is the property of a corporation, this server would normally be either the corporate server or some proxy. For example, when high densities of access are expected, it is not uncommon for administrators to designate third party servers as mirror sites to help manage the anticipated traffic loads. Provided that a connection is possible, then the appliance generates a connection request and, as part of establishing this connection, the appliance can be authenticated. This authentication can be done in any of a number of ways that are well known in the art. For example a password can be exchanged either automatically or with the assistance of a user. A secure password can be created using a time varying identification number as a part of this password such as in the case of an RSA PinPad where the user enters the password root followed by a numeric sequence that is provided by a supplementary appliance. Associated with the application is usually a record which contains permissions that govern the way that the application can be used. By way of example, each time an application participates in a connection with the parent server, new permissions may be applied which can be used to define how the application will behave the next time it is invoked. This is especially helpful when temporary permission is needed because a connection to the server is not possible such as when traveling in an aircraft. So if a user needs to use the application, then the permission log may allow unauthenticated access for some period of time or a limited number of times before a connection must be made to renew permissions. A log may be kept and used to determine if activity is abnormal. The application may continue to function but may no longer be able to read the databases properly and any of a number of methods may be used to restrict an appliance.

If an alteration to the application or its associated data is to be applied by the owner of the data, then an update message may be sent to the user. Authorization processes ensure that only legitimate changes take place based upon the correct information exchanges. Such "challenge and response" methods are well known to those having ordinary skills in the art. In general, a user should either update an application or close the application because data may be expired and its continued use may be unreliable. An application may continue to operate when invoked even if there is an update available but not yet performed. An application may be configured so that one of the first actions is to check for updates before the application is allowed to run. An application may be configured so as to be unable to read information or data that is not current or for which an update exists but is not yet installed. A user accepting an update may receive the updated application file which file may contain a replacement application executable program or data file or a combination of both. Once an updated application is installed, the application icon may indicate that the change is complete. If it is intended that the application is to be removed from the appliance, then the received file may be a "dummy" or some equivalent file which does not contain the operational application it is intended to replace but may be an executable program whose purpose is, at least in part, to disable access to the protected data. Part of the update process may be to delete the persistent data so that all that remains may be some residual structure and the owner of the data is thus protected from attempts to appropriate the data directly.

When the "dummy" application program is invoked, it may further modify any residual data structures and may then display a message that tells the user that they should delete the application since it is no longer authorized. At the time of downloading the "dummy" application, the icon representing the application in the user interface presentation may be altered to inform the user that the application has changed. This new icon may show the original icon modified with, for example, a red 'X' overlaid to indicate an inoperative application. A different icon my also be used. Once the "dummy" application program has executed once, subsequent executions may result in the display of the reminder message to delete the application and it may have no further functionality. Since there is no operational option and the data is no longer viable, the user has no further use for the application and the publisher and/or owner of the data is no longer exposed. At this point, the user would be expected to remove the residue of the application and its icon from the appliance by deleting them since there is no further use for either. This action of deleting is beneficial for the user because at that time, allocated memory that was reserved for the application and associated data structures may be freed and may be returned to the appliance for other use.

The useful data will have been eliminated and the original application which interworked with the data will no longer be functionally present and the user may be denied further access to the corporate information.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Figure 1:
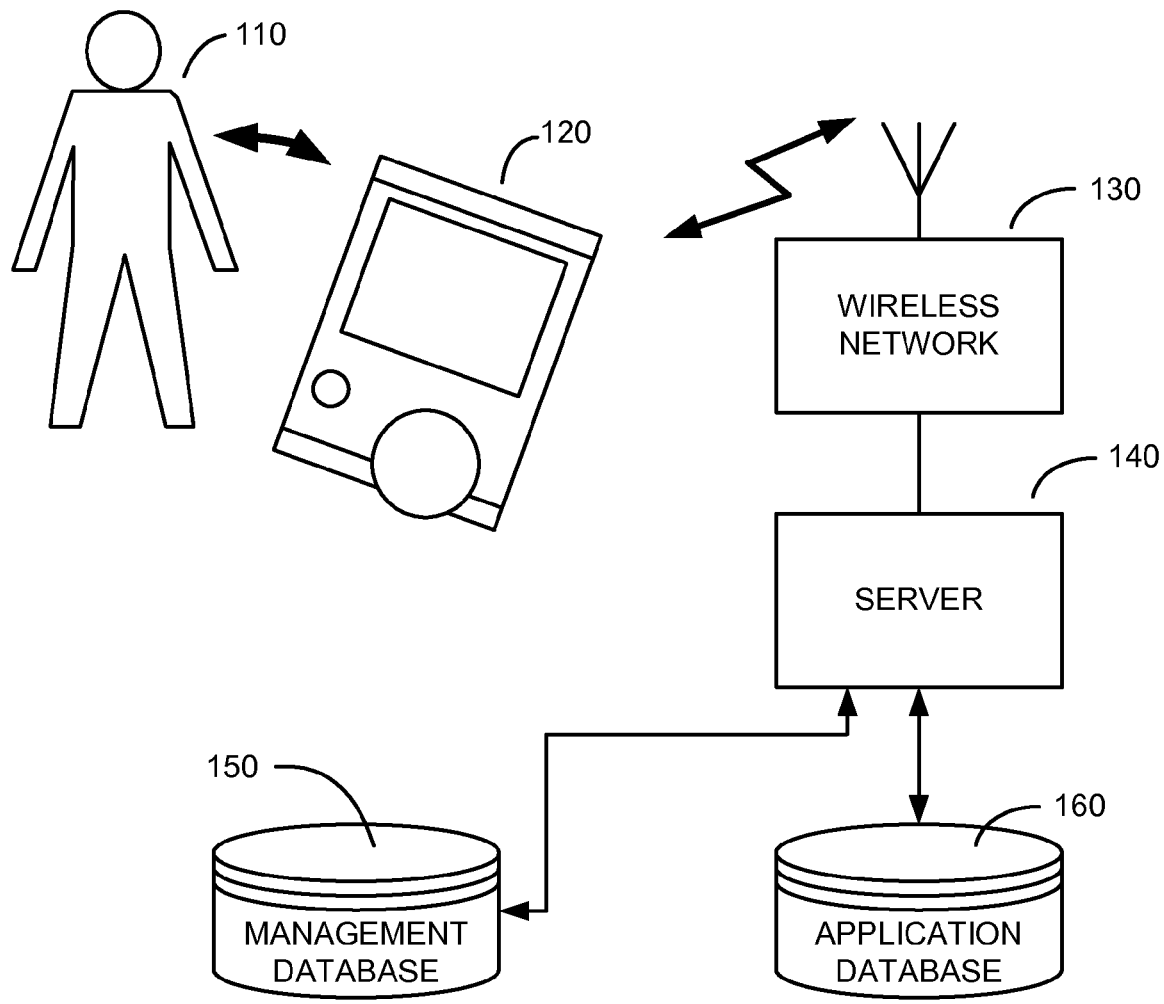
FIG. 1 an example diagram of the application management system in accordance with an embodiment of the present invention.

The present invention relates to a system and methods for remote management of applications downloaded to a personal, portable wireless connected appliance. Applications, generally combinations of programs and associated data structures, are some of the basic utilities that execute on a computing appliance or device. Applications vary in size from small, compact single programs of limited functionality such as a calendar with a display image (these types of applications are often called 'widgets' in the common parlance of the art) through complex, sophisticated programs that show moving maps and routing information, taking data from many sources. These applications comprising programs and data structures may be loaded to the device or appliance by any of a variety of methods. FIG. 1 illustrates one way that applications incorporating the present invention may be distributed. A user 110 enters a request for an application to be downloaded and installed to his wireless appliance 120. This may often be done directly by following a link that was included in a message sent to the user that identifies the location of the desired application, or else a search may be performed first, using some utility such as a browser, until the location of the desired file containing the application is discovered. This process is well known to persons having ordinary skills in the art and examples may be found with several of the smartphone application distributors such as Apple Computer with their AppStore serving devices or appliances such as the iPhone™, RIM with their Blackberry™ App Store and so forth.

The appliance or device generally transmits this user generated request for the desired application to the serving entity 140 via a wireless network access point 130 which may be a cellular network or some other wireless network access point such as, for example, a WiFi network. The receiving Server 140 processes the request and interacts with the Management Database 150 to authorize and record information about this transaction. If the transaction is approved, it is recorded in the Management Database 150 and the Server 140 extracts the requested application from the Application Database 160 and delivers it to the receiving device or appliance 120 via the connecting network. It should be clear that although these transactions often occur in close time proximity to one another, it is functionally acceptable for the time between the initiating request and the final delivery of the requested service to be separated in time and even use different connections for the events. In one example, the server 140 delivers the requested application the next time the user connects to a particular communications connection or port which is more secure than the wide area cellular service. In one implementation, the network access is very simple and comprises a single wired connection to a particular data port linked directly to the serving computer. The majority of devices or appliances which are wirelessly enabled are capable of supporting a wired communications link when a wireless connection is not desirable and it should be clear to one ordinarily skilled in the art that this temporary tethering of the appliance or device by means of a wired connection may be desirable in some cases. The Management Database 150 may contain all records pertaining to a particular user and each time a user connects to the Server 140, a check may be performed to authenticate the user and provide information concerning new applications or changes to applications that may be subsequently downloaded to the device or appliance. When data is rapidly changing, updates may be frequent. If a user is absent or has not been connected for a prolonged period, then the Management Database 150 may cause the Server 140 to transmit a message to the user to inform them of the availability of updates or changes that may be required.

In this invention, the application is different from simple applications in that it is "wrapped" or augmented by a security component, AppGuard™, that actively monitors and controls the operation of and access to the application. AppGuard™ is the subject of a co-pending U.S. application Ser. No. 12/876, 214 filed on Sep. 6, 2010, entitled "System and Methods to Store, Retrieve, Manage, Augment and Monitor Applications on Appliances." In any case, the user authorizes, hence accepts the information transfer and subsequent installation as an operating program with its accompanying data on the appliance.

In the example of a wirelessly connected device, the user may not retain any physical program media as may be the case when, for example, disc media or physical memory such as a flash drive is used to transfer information. Once an application has been installed, the file that performed the installation may be deleted and it is not generally practical to move an application from one device or appliance directly to another. The user may be alerted to the existence of a particular application by the provider or owner of the application information. In the case of an employee or affiliate of a corporation, this may be by a message sent to the user or employee. Although there may be examples of independent individuals who might search for applications by virtue of their membership of some group, for example a shared development environment for, say, games, this is merely a use case variant and need not be considered separately.

The user may be directed to a link which defines the server access point for the connection which permits downloading of the application information. Once a user connects to the server, the appliance may be authenticated before any information is transferred or downloaded. The authentication process may follow any of the processes well known to a person having ordinary skill in the art.

Figure 2A:
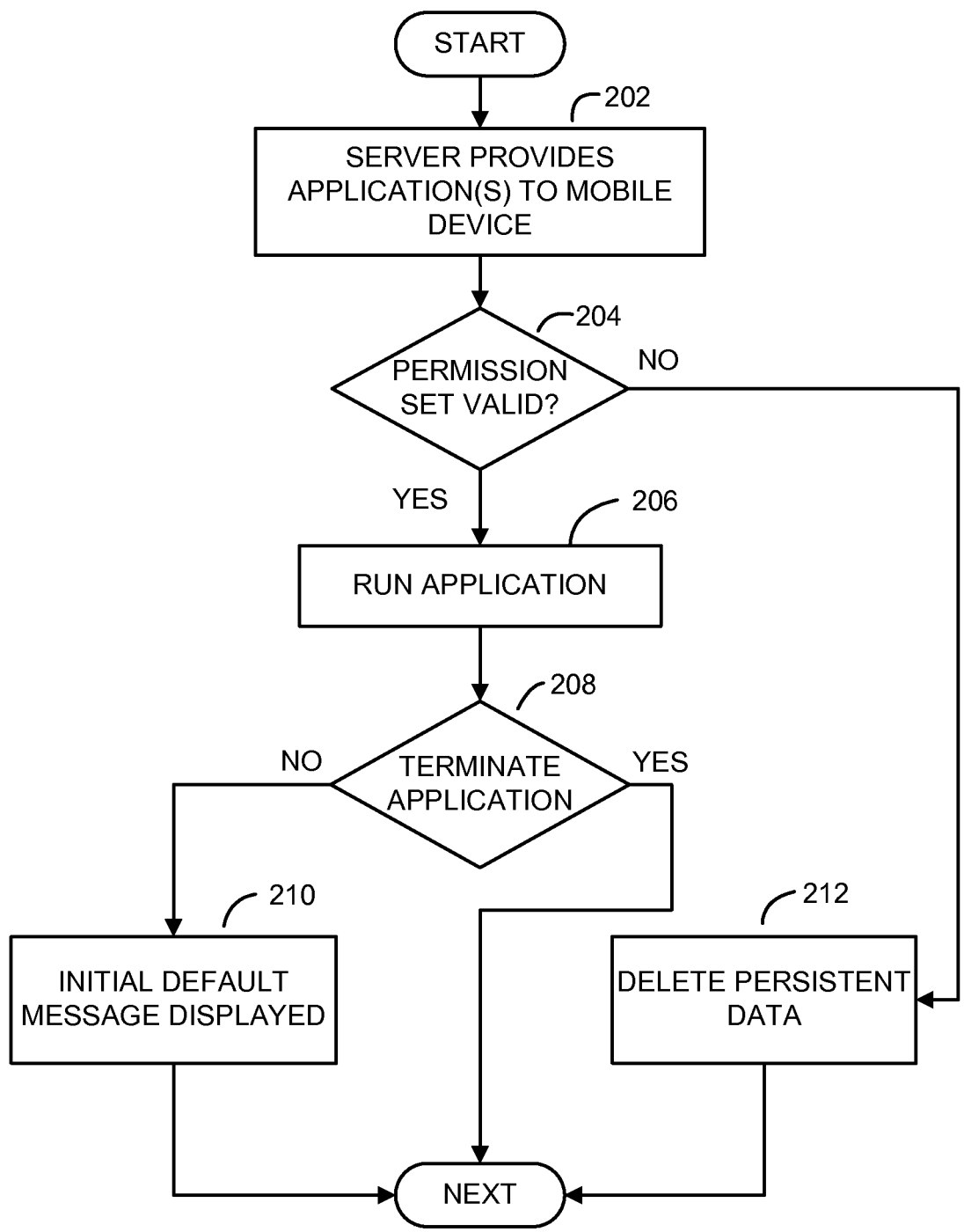
FIG. 2A is an example flowchart for the management of applications within an appliance in accordance with an embodiment of the present invention.

FIGS. 2A and B illustrate the AppGuard™ process which is the subject of the co-pending application. A very brief description is repeated for convenience. At FIG. 2A, once the Server 140 has provided the application to the device or appliance at step 202, the permission state of the appliance is tested at step 204. If the application was taken from a non-authorized or improperly authorized source, for example as a result of the file being misappropriated or copied, the correct permission data will not be present and this test will fail because the device will not be registered at the Management Database 150. At this point (following the "NO" branch), the data may be deleted at step 212 and the application may be compromised so as to be of no further use. However, in a properly negotiated delivery, the permission test will succeed and the application will install and run 206. Assuming that the application is permitted to run without being terminated at step 208, following the 'NO' branch, the display of a startup message 210 may be invoked; in one implementation, this message may be a welcome screen. The subsequent activity of the device or appliance may depend upon the particular contextual state and either the application will enter a normal running state that allows a user to interact with it or else will return to an intermediate state which, in one implementation, may be a warning state, or possibly a starting state from which a new user action may be commenced.

Figure 2B:
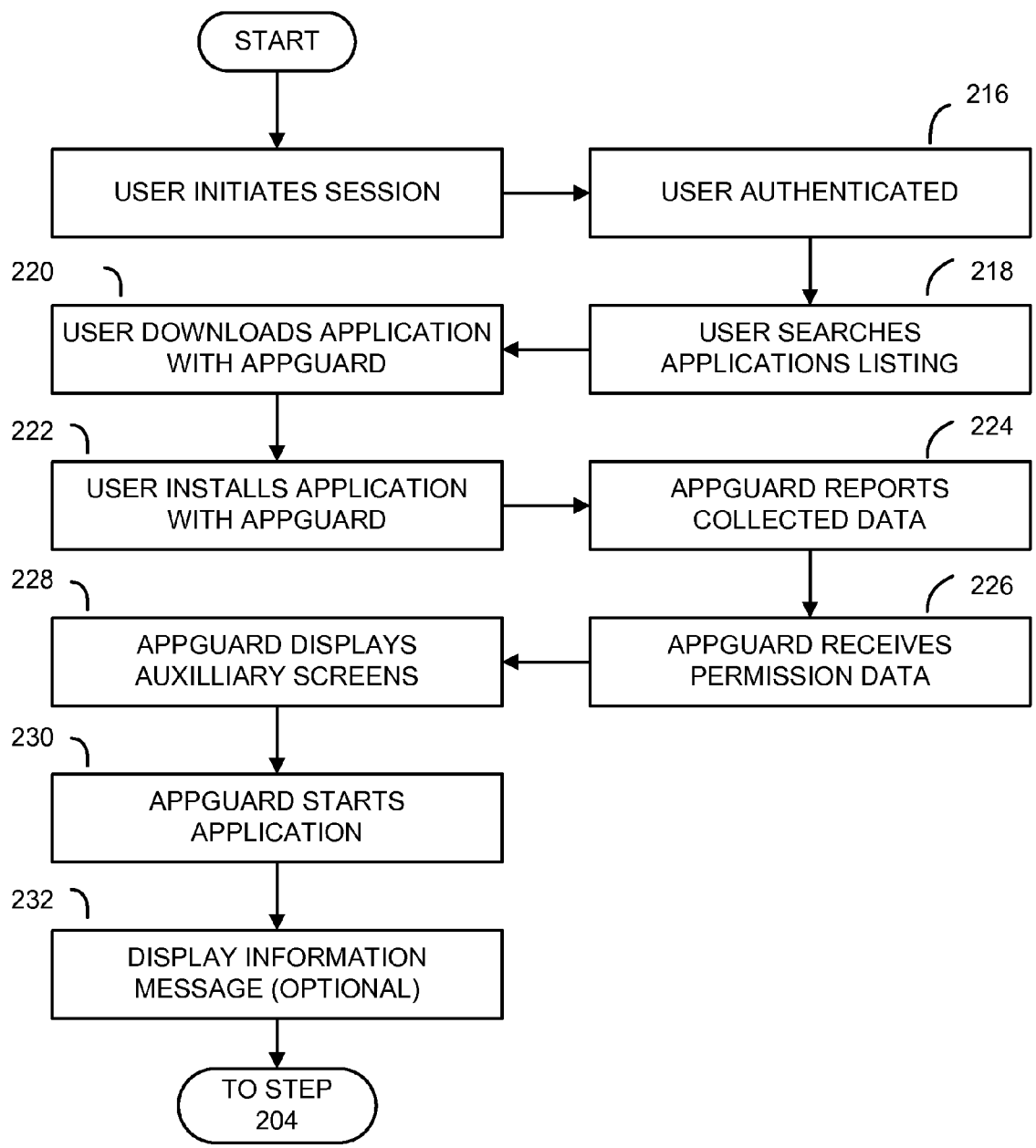
FIG. 2B is an example flowchart for providing an application to the appliance in accordance with an embodiment of the present invention.

Referring now to FIG. 2B, the detail of the steps incorporated in step 202 is shown. Whenever a user starts a session which is protected by AppGuard™ such as, for example, beginning to interact with corporate data, authentication is an essential feature. Step 216 is a required step; if authentication is not possible because a communications link cannot be established, then either the user may be precluded from working with applications or processes which require authentication or else some predetermined allowance may be made by which a user may continue to work. For example, in one implementation, a user is simply stopped and shown a message then asked to try again. In a second implementation, a user is permitted to proceed up until the start of the application program whereupon auxiliary authentication is requested by the appliance or device, which authentication may comprise a password along with some other verification that the user is authentic. These secondary authentication methods are known to persons having ordinary skills in the art.

Following authentication, the sequence moves to step 218 in which the application itself is selected. This may be a list of offered applications where in one example only appropriate items are shown. In a second implementation, available applications are shown with unavailable applications being distinguished in some way; it is common in the art for unselectable items to be grayed out or struck through. Step 220 downloads the AppGuard™ augmented application and step 222 installs the protected application. Once an application is installed on the device or appliance and is subsequently invoked, AppGuard™ forces a connection to report information which may have been collected at step 224. This information may be comprised of any information that the provider or owner of the application program requires. It should be clear from this that invocation of the application core is always done through the AppGuard™ shell or wrapper. In all cases, steps 224 to report collected data and receive permission data 226 must always be executed so a user is always subject to the control of the management database 160. Once permission data is received and verified, the AppGuard™ process may display auxiliary screens 228. In one implementation, the displayed information informs the user that the application is protected by AppGuard™ and that collected data is reported. Once the auxiliary screens have been shown and either acknowledged by the user or displayed for a certain amount of time, then the application invoked is started 230 by the AppGuard™ component of the program. At that time, any startup messages may be displayed at step 232 prior to accepting user input to the application. Returning to FIG. 2A, it can be seen that if the permission test is failed, the persistent data may be deleted. However, the co-pending application does not consider the need to remove the application from the appliance in the case where it is protected by service rules such as in the case of the Apple iPhone™ and the Apple iPad™.

Figure 3:
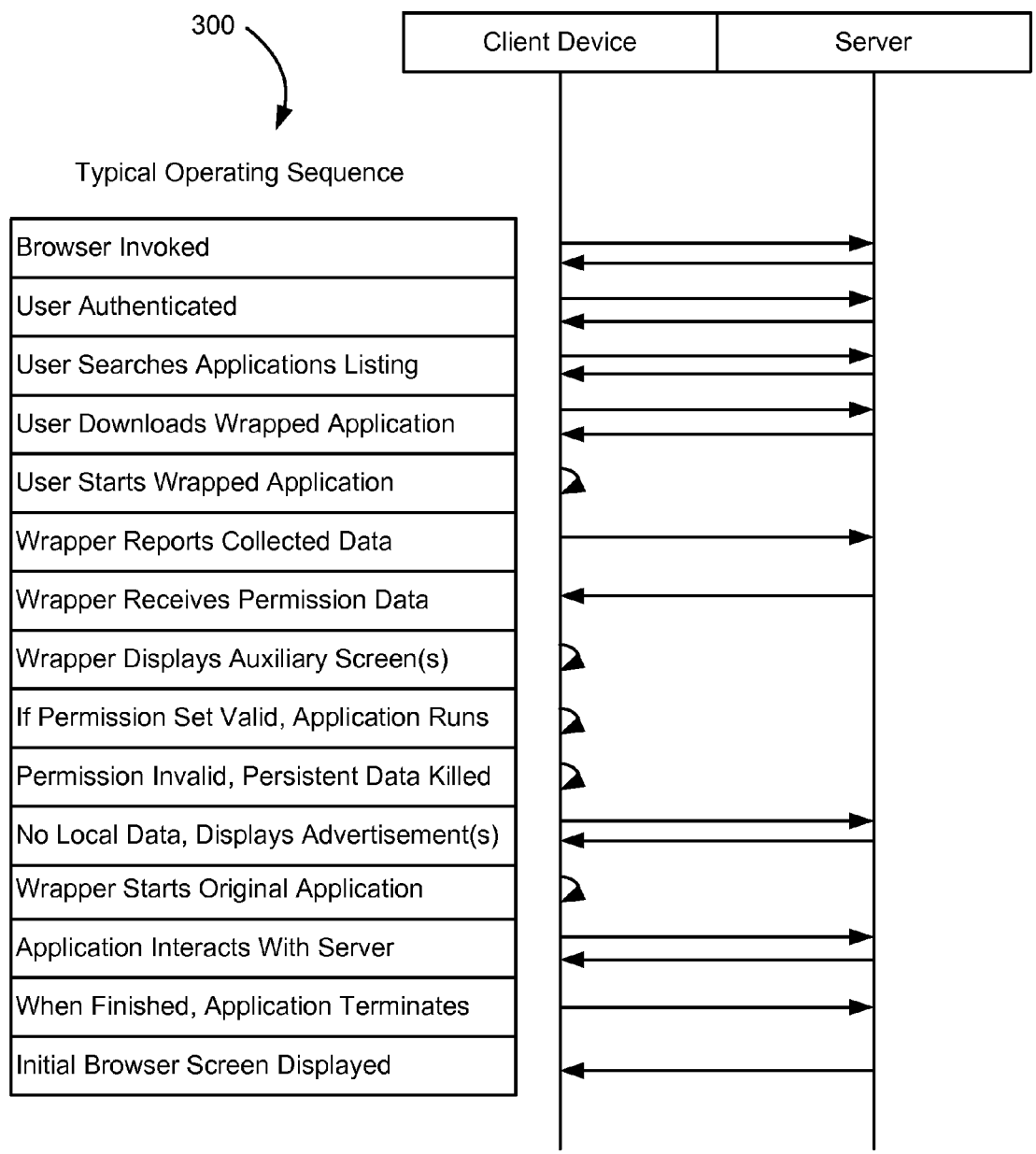
FIG. 3 is an example signal flow diagram of the transactional steps completed between the appliance and a server in accordance with an embodiment of the present invention.

FIG. 3 shows an example of a signal flow between the client appliance and the remote server which elaborates on the Typical Operating Sequence 300 communication exchanges for the procedural steps in FIG. 2B. It distinguishes between required exchanges to and from the server and local transactions. Although it is representative of a typical sequence, it should be evident to one of ordinary skill in the art that this represents a normal flow. In abnormal circumstances, certain steps may be bypassed or eliminated and the program which is executing on the device or appliance must provide for these conditions. In a typical computer based implementation, a browser may be used to begin the process of downloading an application. In the case of the instant invention this may be done through a browser or through an AppStore connection using the Apple Computer distribution model. There are numerous communication session methods known in the art which may be substituted, at least in part, for a browser session.

Authentication is a key element to any transaction where data is to be secured. The AppGuard™ technology provides a version of an application which is supplemented by the AppGuard™ security shell. This security shell ensures that the application distributor or the controlling agency remains aware of the application's operational status and provides for a way to disable the application when this action is required to protect the information. Terminating the application and deleting persistent data may be sufficient in many cases. In general, permissions may be set and reset to accomplish this functionality however, in the case of smartphones such as the Apple iPhone™, the distribution agreements may restrict certain actions which are usual in a general environment. For example, in some cases an application may not modify itself or may be limited as to the ability to be disabled. This invention overcomes some of these limiting processes.

Figure 4:
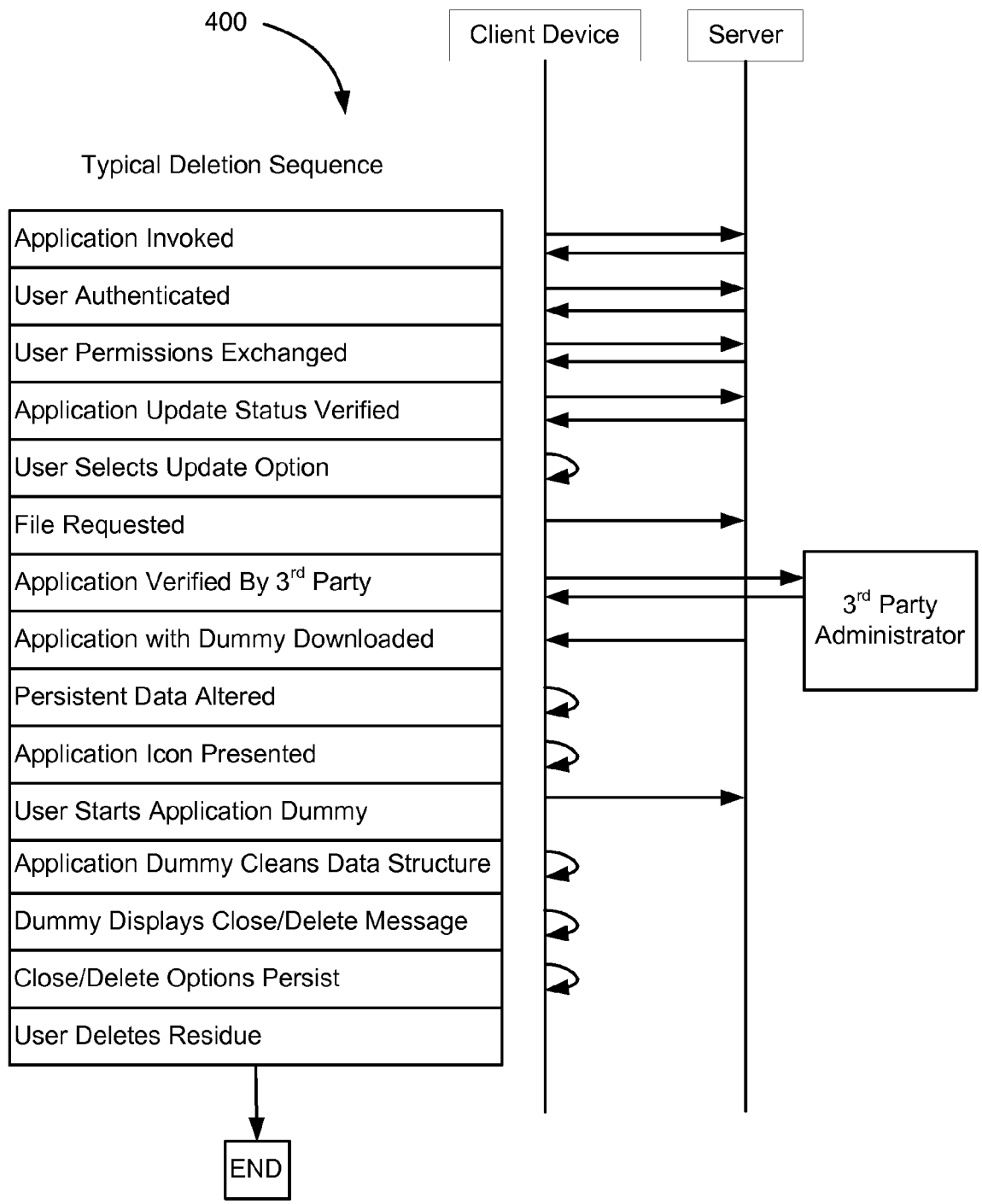
FIG. 4 is an example signal flow diagram of the transactional steps completed between the appliance and a server in accordance with an embodiment of the present invention.

FIG. 4 exemplifies the extended signal flow showing a Typical Deletion Sequence 400 for the instant invention. In a typical implementation, where the AppGuard™ component is part of the application software, the invocation of the application sets off a chain of events beginning with the reporting to the server of the request to invoke. This element, maintaining any required rapport with a server, is a feature of the AppGuard™ technology described in the co-pending application Ser. No. 12/876,214 filed on Sep. 6, 2010, entitled "System and Methods to Store, Retrieve, Manage, Augment and Monitor Applications on Appliances."

Where an application is to be updated, this may be accomplished using the normal processes known in the art. The Typical Deletion Sequence 400 for causing the deletion of an application may differ. At any time during the launching of an application, the user may be authenticated. Because a connection may be unavailable, this authentication and any related exchange of permissions may be deferred until the next time a connection is possible. In one implementation, the permission status is set valid for a predetermined time. In another, the permission status maybe set valid for a predetermined number of launches and, in yet another implementation, a combination of these constraining permissions may be used. The purpose of this flexible permission treatment is to allow a user to access working material when connection is impractical or limited by the network. The former instance might reflect a traveler in an aircraft outside the range of a communications link whereas the latter might be a restriction beyond reasonable control of the user such as an intermittent connection due to an interfered radio channel.

When communication is restored, the permission status may be reset. The application status is checked and if an update is available, the user may be informed. In one implementation the communications speed may be ascertained and if it is adequate, the update option may be offered to the user, otherwise the user may be informed that the performance of the communications link is insufficient. In another implementation, a user may be allowed to bypass the update process and continue to use the out-dated application; this would accommodate a time-constrained user or occasional unreliability or inadequacy of the communications network whereby an update might be an impractically lengthy process. In yet another implementation, the user may be required to select the update option prior to being allowed any further access to the application.

Once the update is authorized, the client appliance places a file request to the server. In some cases permission may be required from a third party administrative server. This is commonly used as a way to ensure that the application publisher really is the provider of the requested file and this "gate keeping" process limits malicious interference or activity. Successful administrative authorization may then allow the requested file, supplemented by the AppGuard™ program, to be downloaded to the device or appliance.

In normal circumstances usual in the art, the application is merely updated to a current version in accordance with known technologies. However, when an application is intended to be deleted, then a "dummy" application is downloaded. This "dummy" is an executable program which may have none of the operational features of the application which is being replaced. Typically, an application icon is changed to an information condition so that an observer sees that there is a process underway; a user may not interfere with this process and the informative icon cannot be used to invoke the application at this time. As part of this download, persistent data in the client device may be altered. Because the "dummy" application is no longer the original application, the persistent data may be entirely deleted or otherwise obfuscated. Once the data is no longer in a usable form, then the application icon may be restored from its "updating" informative condition and a user may now use it again to invoke the underlying application.

In one implementation, the icon representing the application may be changed during the download and installation process so as to inform the user that the application is now disabled or changed from its original function. This icon may be a simple modification such as overlaying a distinctive mark upon the original icon. Examples of this might be a large 'X' colored so as to contrast with the original icon or, in another example, a red circle struck through at an angle with a red diameter bar similar to the traffic "do not enter" sign. More humorous implementations may display any of a number of icons associated with distress or negative emotions. In one implementation a partially diminished image of a grinning cat, reminiscent of the Cheshire Cat character from the "Alice in Wonderland" stories by Lewis Carroll, is used to suggest that the application has disappeared. In another, a "Skull and Crossbones" motif is presented as the replacement icon to suggest that something bad has happened to the application.

Once a user selects the icon for the replacement or "dummy" application, the program may execute immediately. Because the purpose of the program may be merely to complete any remaining clean-up tasks prior to being deleted, there is no requirement for there to be any authentication. However, in one implementation, the authentication process proceeds in much the same way as it did originally so as to preserve the look and feel with the purpose of maintaining the same user experience.

Upon execution, the program (the "dummy" application) may clean up any remaining data or data structures so that remnants of the application are not left behind as a clue to unauthorized inspection of the appliance. Once any changes or modifications have been completed, the application may display a dialogue message to the user of the appliance offering a choice to close the application. The message may inform the user that the application may or should now be deleted since it is no longer functional as the original application on the appliance. It may include instructions to assist the user. The dummy application may modify the icon displayed if this action is supported on the appliance; some appliances do not permit alteration of the icon by the program itself since this would constitute a self-altering functionality which may be considered undesirable. When the application is next invoked, it may only display instructions to delete. The user need not physically delete the remnants of the "dummy" application. In one implementation, the application may communicate to the server that the process has been completed except for the user deletion. This may trigger a further update process for other applications resident on that particular device or appliance.

In one implementation of the system, the server may determine that more than one application on the client device needs to be updated with a dummy application in order to limit the access to the information available to the user. In this case the step wherein the application update status is verified returns information that lists all of the affected applications. The user may be informed by any of a number of well known methods that updates are waiting to be downloaded. In an alternative implementation, when an application is updated the next application to be updated is listed for the user so that the update information arrives in a serial fashion rather than in a single list.

In sum, the present invention provides a system and methods for managing applications which are downloaded to a device or appliance where the application owner or distributor may wish to control the use of the application and associated data. Especially the invention provides a method to disable an application and prompt its deletion wherein the user retains no operational functionality from the original application nor valid data. The advantages of such a system include the ability to overcome the normal constraints of an application to be unable to alter itself or to delete itself without violating the terms of service and regulations which govern application distribution, as exemplified in the Apple Computer™ distribution model.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for managing application data on a portable appliance including an operating system and an application configured to run on the operating system, the method comprising:
receiving, at a server, a request to update the application on the portable appliance, the application comprising an application executable and application data; and
sending, from the server, a dummy application executable to the portable appliance in response to receiving the request to update the application,
wherein the dummy application executable is configured to replace the application executable on the portable appliance and to disable the application data on the portable appliance, without updating the operating system on the portable appliance, when the application is invoked.

2. The method of claim 1, wherein disabling the application data comprises deleting the application data.

3. The method of claim 1, wherein the dummy application executable is further configured to cause the portable appliance to display a visual indication that the application data has been disabled.

4. The method of claim 1, wherein the portable appliance is a cellular telephone.

5. The method of claim 1, wherein the request to update the application is received from the portable appliance.

6. The method of claim 1, wherein the application executable comprises an operational feature and the dummy application executable does not include the operational feature.

7. The method of claim 1, further comprising:
receiving authentication data from a user of the portable appliance; and
authenticating the user based on the authentication data.

8. The method of claim 1, wherein the application is augmented with a security component configured to control access to the application data.

9. A server for managing application data on a portable appliance including an operating system and an application configured to run on the operating system, the server configured to:
receive a request to update the application on the portable appliance, the application comprising an application executable and application data; and
send a dummy application executable to the portable appliance, in response to receiving the request to update the application,
wherein the dummy application executable is configured to replace the application executable on the portable appliance and to disable the application data on the portable appliance, without updating the operating system on the portable appliance, when the application is invoked.

10. The server of claim 9, wherein disabling the application data comprises deleting the application data.

11. The server of claim 9, wherein the dummy application executable is further configured to cause the portable appliance to display a visual indication that the application data has been disabled.

12. The server of claim 9, wherein the portable appliance is a cellular telephone.

13. The server of claim 9, wherein the request to update the application is received from the portable appliance.

14. The server of claim 9, wherein the application executable comprises an operational feature and the dummy application executable does not include the operational feature.

15. The server of claim 9, wherein the server is further configured to:
receive authentication data from a user of the portable appliance; and
authenticate the user based on the authentication data.

16. The server of claim 9, wherein the application is augmented with a security component configured to control access to the application data.

17. A non-transitory, computer-readable medium comprising computer-executable instructions which, when executed by a processor in a computing device, cause the computing device to perform a method of managing application data on a portable appliance including an operating system and an application configured to run on the operating system, the method comprising:
receiving, at the computing device, a request to update the application on the portable appliance, the application comprising an application executable and application data; and
sending, from the computing device, a dummy application executable to the portable appliance, in response to receiving the request to update the application,
wherein the dummy application executable is configured to replace the application executable on the portable appliance and to disable the application data on the portable appliance, without updating the operating system on the portable appliance, when the application is invoked.

18. The non-transitory, computer-readable medium of claim 17, wherein disabling the application data comprises deleting the application data.

19. The non-transitory, computer-readable medium of claim 17, wherein the method further comprises:
receiving authentication data from a user of the portable appliance; and
authenticating the user based on the authentication data.

20. The non-transitory, computer-readable medium of claim 17, wherein the application is augmented with a security component configured to control access to the application data.

* * * * *